(12) United States Patent
Fussy (10) Patent No.: US 8,890,919 B2
(45) Date of Patent: Nov. 18, 2014

(54) VIDEO CONFERENCING DISPLAY AND METHOD TO FACILITATE ENHANCED EYE CONTACT

(75) Inventor: Thomas M. Fussy, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 13/408,480

(22) Filed: Feb. 29, 2012

(65) Prior Publication Data

US 2013/0222522 A1   Aug. 29, 2013

(51) Int. Cl.
*H04N 7/14* (2006.01)

(52) U.S. Cl.
USPC ............................ 348/14.01; 348/14.16

(58) Field of Classification Search
USPC ................................. 348/14.16; 345/690, 270
See application file for complete search history.

(56) References Cited

U.S. PATENT DOCUMENTS

| 5,117,285 | A | 5/1992 | Nelson et al. |
| 6,882,358 | B1 | 4/2005 | Schuster et al. |
| 7,126,627 | B1 | 10/2006 | Lewis et al. |
| 7,136,090 | B1 | 11/2006 | McDuffie White |
| D636,359 | S | 4/2011 | Buzzard et al. |
| D637,570 | S | 5/2011 | Desai et al. |
| 2004/0196359 | A1 | 10/2004 | Blackham |
| 2005/0110865 | A1 | 5/2005 | Wintzen et al. |
| 2008/0106592 | A1* | 5/2008 | Mikami ............ 348/14.16 |
| 2011/0102538 | A1 | 5/2011 | Tan |
| 2011/0304657 | A1* | 12/2011 | Yamamura et al. ...... 345/690 |
| 2012/0044224 | A1* | 2/2012 | Michisaka ............... 345/207 |
| 2012/0075274 | A1* | 3/2012 | Ueno et al. ............... 345/207 |
| 2012/0075362 | A1* | 3/2012 | Ichioka et al. ........... 345/690 |
| 2013/0287313 | A1* | 10/2013 | Marchessoux et al. .... 382/274 |

FOREIGN PATENT DOCUMENTS

| EP | 0567597 B1 | 3/1997 |
| EP | 0704135 B1 | 8/1999 |
| WO | WO 94/30016 A1 | 5/1997 |
| WO | WO 97/18664 A1 | 5/1997 |
| WO | WO 03/101101 A1 | 12/2003 |
| WO | WO 2007/087142 A3 | 8/2007 |

* cited by examiner

*Primary Examiner* — Stella Woo
(74) *Attorney, Agent, or Firm* — Tarolli, Sundheim, Covell & Tummino LLP (57) ABSTRACT

A display apparatus includes an illumination source that provides light across a surface area of a front panel of the display apparatus. A control system is configured to control the illumination source to increase an intensity of the light for a local region of a front panel of the display apparatus relative to an intensity of the light from the illumination source for at least an adjacent region of the front panel that is adjacent to the local region. The local region of the front panel corresponds to a location for a partial mirror at the front panel.

18 Claims, 6 Drawing Sheets

VIDEO CONFERENCING DISPLAY AND METHOD TO FACILITATE ENHANCED EYE CONTACT

TECHNICAL FIELD

This disclosure relates generally to a video conferencing display and method to facilitate enhanced eye contact.

BACKGROUND

Videoconferencing typically employs telecommunication technologies at multiple locations to enable simultaneous two-way video and audio transmissions. One or more cameras are positioned at each site to capture an image of participants involved in the videoconference. To mitigate an incorrect impression regarding eye contact of participants, some videoconferencing systems have cameras located in the screens. This approach, however, tends to obstruct a portion of the screen.

DESCRIPTION OF EXAMPLE EMBODIMENTS

Overview

This disclosure relates to a video conferencing display apparatus and method to facilitate enhanced eye contact.

By way of example, the display apparatus includes a light source that is controlled to provide light for a local portion of a display with an increased intensity relative to a remaining portion of the display. The light source can include a plurality of light emitting diodes, which may be independently controllable. The local portion of the display can be substantially aligned with a location for a partial mirror. By increasing the intensity of light for the selected portion of the display where the partial mirror resides, a dimming effect resulting from placement of the partial mirror can be mitigated. This can make the mirror appear substantially invisible on the display during use.

As a further example, a video conferencing system can implement the display apparatus in combination with a camera. The camera can be aimed at the partial mirror to capture light from the mirror, including light reflected from the mirror and light transmitted through the mirror from the display apparatus. For example, the partial mirror can be positioned at or near an expected eye-gaze location of a participant. The camera can also include a polarizer to block out polarized light transmitted through the mirror from the display. In this way, the light (e.g., an image) captured by the camera can include a participant looking into the camera without the light provided from the display.

Example Embodiments

Figure 1:
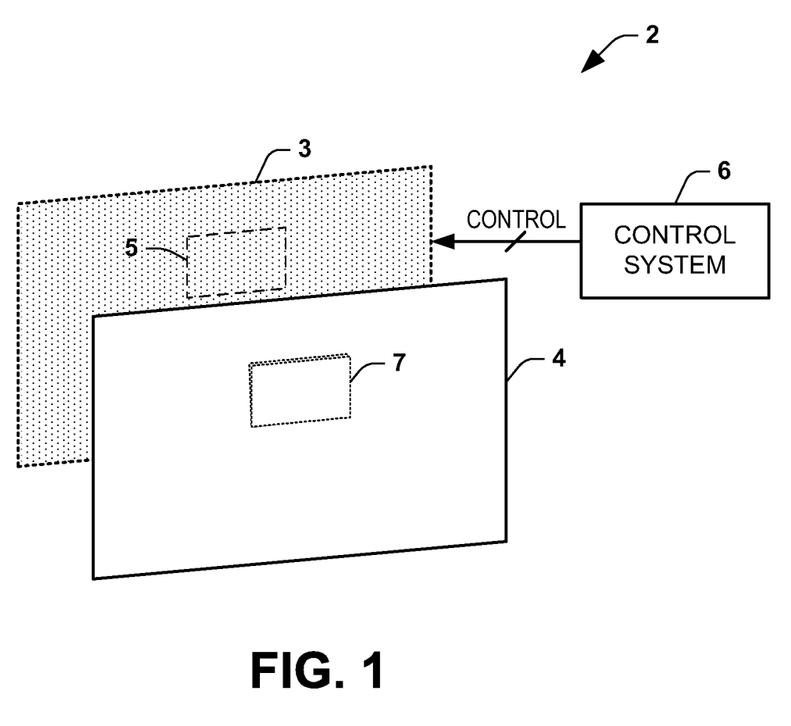
FIG. 1 depicts an example of a display apparatus.

FIG. 1 depicts an example of a display apparatus 2. The display apparatus 2 includes an illumination source 3 that provides light to a front panel 4 of the display apparatus. The front panel 4 thus provides the resulting light, such as corresponding to an image or video. The illumination source 3 can include a plurality of light sources. In one example, the plurality of light sources can be implemented as a plurality of light emitting diodes (LEDs). Each of the light sources in the illumination source 3, at least those residing within a local region 5, can provide light with an intensity that is controllable, such as based on a control signal from a control system 6.

As one example, the plurality of light sources (e.g., LEDs) can be implemented to provide backlighting for the display apparatus. As another example, the plurality of light sources can be implemented as a pixel array of LEDs, such as organic LEDs or inorganic LEDs (e.g., crystal LEDs), which are operated to provide light corresponding to an image based on electronic data information supplied to the pixel array. In each of these examples, the light provided from the front panel 4 can have a predetermined polarization.

The control system 6 can be configured to control the illumination source 3 to increase an intensity of the light for the local region 5, which corresponds to a location for a partial mirror 7 at the front panel 4. The increase in intensity of light for the local region 5 is relative to an intensity of the light from the illumination source 3 for at least an adjacent region of the front panel 4 that is adjacent to the local region.

As used herein, a partial mirror refers to any one-way mirror construct that is configured to be partially reflective and partially transparent. A partial mirror, depending on its context, may also be known as a two-way mirror, one-way glass, two-way glass half-silvered mirror or beam splitter. As an example, the partial mirror can be formed of glass that is coated with, or encased by, a thin and almost-transparent layer of metal (e.g., aluminum). This provides the partial mirror 7 with a mirrored surface that reflects a portion of light and is penetrated by the remaining portion of the light. For example, the partial mirror 7 can be implemented to have a reflectivity ranging from about 50% to about 80% and transmittance ranging from about 50% to about 20%. In other examples, the partial mirror 7 can be implemented with a reflectivity of about 50% and a transmittance of about 50%. The intensity of the light for the region 5 can be adjusted depending on the transmittance of the partial mirror 7. The increase in intensity of the light (e.g., implemented by the control system 6) for the local region 5 thus can mitigate effects of the attenuation in intensity caused by placing the partial mirror 7 at the front panel.

As disclosed herein, the display apparatus 2 can be implemented in combination with a camera (not shown—but see, e.g., FIG. 4) to provide a video conferencing system. The camera can be arranged and configured to capture light from the partial mirror, which can include light transmitted through the partial mirror from the display apparatus 2 and light that is reflected from the partial mirror. Because the light from the display apparatus will have a predetermined polarization, the camera can employ a polarizing filter configured to block the light transmitted through the partial mirror from the display which is also polarized. As a result, the camera can only capture light that is reflected from the partial mirror, such as corresponding to a participant in a video conference. By strategically placing the mirror at the eye-gaze point for such participant, enhanced eye contact for the participant can be realized, while the dimming effect of the mirror may be mitigated due to the localized control of the light intensity for the region 5 that is aligned with the partial mirror 7.

Figure 2:
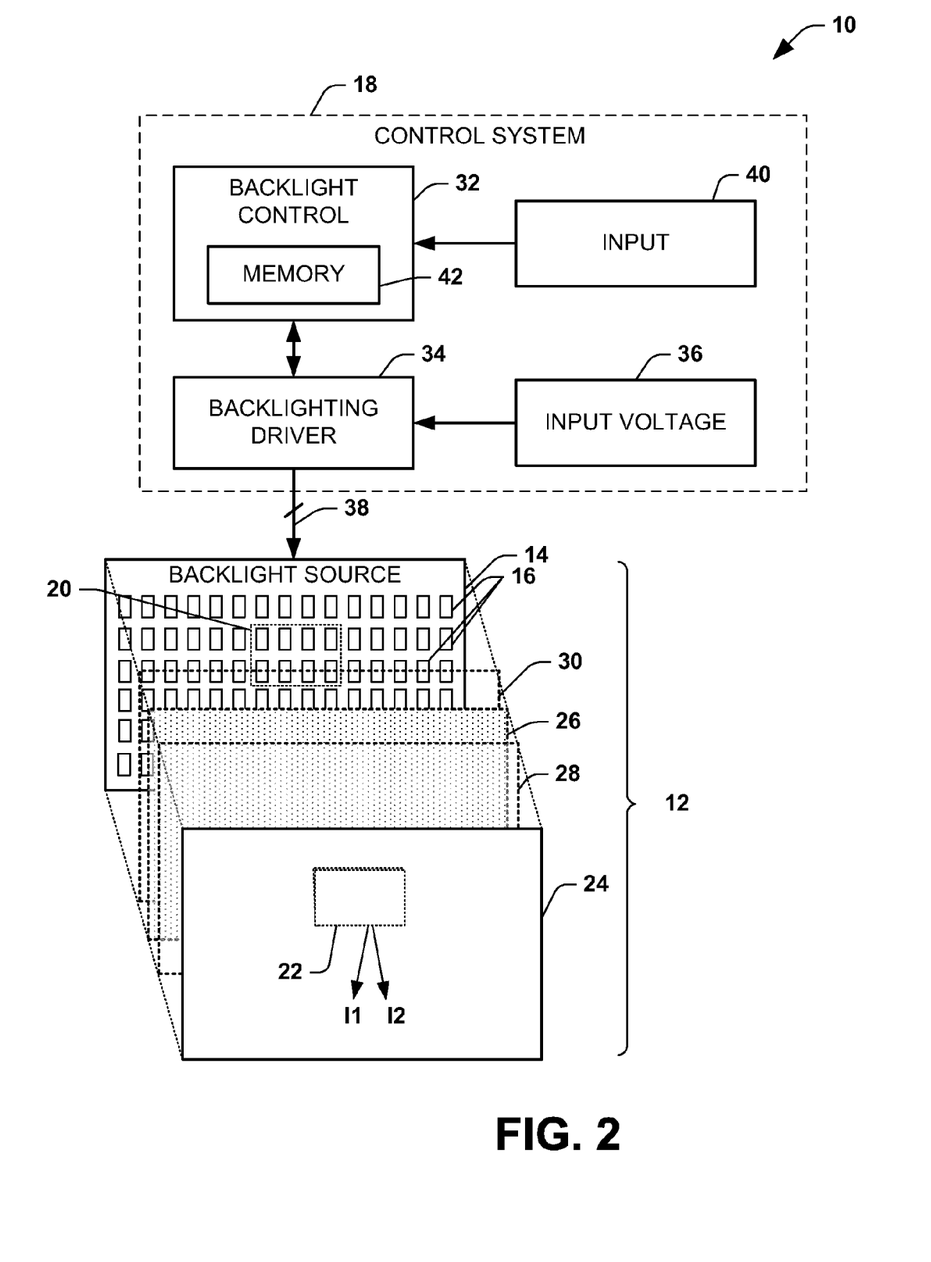
FIG. 2 depicts another example of a display apparatus.

By way of further example, FIG. 2 depicts a display apparatus 10 that can provide for enhanced eye contact for video conferencing. The display apparatus 10 can include a liquid crystal display (LCD) 12. The LCD 12 can include a backlight source 14 configured to emit light that passes through the LCD. The backlight source 14 can be built into the sides or back of the LCD 12, such as can depend on the type of light sources and application requirements. In some examples, the LCD 12 may include a diffuser panel (not shown) to disperse light from the backlight source and thereby provide a more uniform light level.

In the example, of FIG. 2, the backlight sources 14 is demonstrated as including a plurality of light sources 16, which can be arranged in a two-dimensional array. The light sources 16 can be implemented as including fluorescent tubes (e.g., multiple cold cathode fluorescent tubes (CCFTs)) or light-emitting diodes (LEDs). For instance, the light sources 16 can be implemented as white LEDs, red/green/blue (RGB tricolor) LEDs as well as different combinations thereof that may vary depending on application requirements. RGB tricolor LEDs can be controlled (e.g., by the circuitry 18) to help produce richer more vivid colors and improve colorimetry of the LCD 12.

Each of the light sources 16 thus can be illuminated to produce backlighting for the LCD 12. One or more groups of the light sources 16 can be controlled selectively via circuitry 18 to provide the backlighting. For instance, the circuitry 18 can provide an output to control different groups of the light sources 16, which may include one or more such groups operated with different intensities. Alternatively, the circuitry 18 can control each of the light sources (e.g., LEDs) 16 individually such as to selectively provide more granular backlighting control for different regions of the LCD 12.

As one example, one or more regions of the backlight source 14, demonstrated by a dashed line 20, can be operated with a backlighting intensity that is greater than the intensity of backlighting outside of the region. The region 20 can be substantially aligned with a partial mirror 22 that is located at a surface of an optically transparent front panel 24 of the LCD 12. As used herein, the term "substantially" is intended to allow some amount of variations in a quality or arrangement of the term that it modifies, such as including manufacturing or process variations (e.g., about 5%). The partial mirror 22 can be dimensioned to overlie only a selected portion of the front panel 24, such as corresponding to or near the expected eye gaze point for participants of a video conference. The eye gaze point can be set by the manufacturer of the display or it can be identified during set up or installation of the display apparatus.

As used herein, a partial mirror refers to any one-way mirror construct that is configured to be partially reflective and partially transparent. A partial mirror, depending on its context, may also be known as a two-way mirror, one-way glass, two-way glass half-silvered mirror or beam splitter. As an example, the partial mirror can be formed of glass that is coated with, or encased by, a thin and almost-transparent layer of metal (e.g., aluminum). The partial mirror 22 includes a mirrored surface that reflects a portion of light and is penetrated by the remaining portion of the light. For example, the partial mirror 22 can be implemented to have a reflectivity ranging from about 50% to about 80% and transmittance ranging from about 50% to about 20%. In other examples, the partial mirror 22 can be implemented with a reflectivity of about 50% and a transmittance of about 50%. The intensity of the backlighting for the region 20 can thus vary as a function of the transmittance of the partial mirror 22.

In the context of the display apparatus 10 of FIG. 2, the outwardly exposed surface of the partial mirror 22 can be configured at an angle relative to the surface of the front panel 24 to reflect light from an external object (e.g., corresponding to a user and part of the conferencing environment), demonstrated at 11. The partial mirror 22 can also transmit light provided from the LCD 12, demonstrated at 12. The light 11 that can be provided to a camera (not shown, but see FIG. 4 or 7) and include a combination of reflected light and transmitted light. Due to the backlighting control by the circuitry 18, the intensity of light that is transmitted through the partial mirror 22 and the light transmitted from the front panel 24 around the mirror can be substantially uniform such that mirror appears obfuscated or hidden during use.

The circuitry 18 can control the backlight source 14 to implement intensity variations that result in the substantially uniform light intensity to a user of the LCD 12. For example, the circuitry 18 can increase the intensity for light sources 16 within the region 20. Alternatively, the intensity of the light sources 16 outside of the region 20 can be attenuated relative to the light sources within the region 18. Depending on the type and processing capabilities of the display apparatus 10, the light sources 16 can be operated with a substantially constant intensity or the intensity of the light sources can be dynamically modulated. Regardless of the operating in a constant or modulated mode, the circuitry 18 can control the backlighting of the local region 20 to have an increased intensity relative the backlighting outside of the region.

As a further example, the intensity of the light sources 16 can be modulated dynamically as successive frames of video are displayed. Such dynamic modulation can be adjusted for each frame or for multiple frames. For instance, if a given frame is relatively bright, the circuitry 18 can operate the light source 14 at or near an increased (e.g., a predetermined maximum) intensity with the intensity of the region 20 being greater. In contrast, if a frame is to be darker, the circuitry 18 can attenuate the output to backlight source 14 to a lower (e.g., a predetermined minimum) intensity while the backlighting intensity for the region is increased by a predetermined amount than the lower intensity, such as to reduce leakage and darken the image. However, the circuitry 18 controls the backlighting intensity for the region 20 that is aligned with the partial mirror 22 at a level that is increased relative the normal minimum intensity. In addition to modulating backlighting intensity over time between one or more frames, the circuitry 18 can dynamically modulate the light sources 16 spatially depending on the local darkness or brightness of the individual pixels in each frame or a series of frames.

To produce the image via the panel 24, the LCD 12 also includes an array of pixels indicated at 26. Each of the pixels in the backlight source 14 can include a layer of molecules (e.g., liquid crystal material) aligned between two optically transparent electrodes. The array of pixels 26 can also be positioned between two polarizing filters 28 and 30. The polarizing filters 28 and 30 can have optical axes of transmission that are perpendicular to each other, for example. A pixel control system (not shown) can include semiconductor switches configured to cause the crystalline material in the respective pixels in the array 26 to operate as a shutter, thereby controlling light that passes from the backlight source 14 and through the LCD 12.

As an example, light from the backlight source 14 impinging on the first polarizer 30 comprises electromagnetic waves vibrating in a plurality of planes. Only that portion of the light vibrating in the plane of the optical axis of a polarizer 30 can pass through the polarizer. In the LCD 12, the optical axes of the first and second polarizers 28 and 30 are arranged at an angle so that light passing through the first polarizer would normally be blocked from passing through the second polarizer in the series. Thus, by controlling the voltage (and/or current) applied across the liquid crystal layer of each pixel in the array 26, the physical orientation of the molecules of liquid crystal can be controlled and the plane of vibration of light transiting the columns of molecules spanning the layer 26 can be rotated to either align or not align with the optical axes of the polarizers 28 and 30. The resulting light provided from the LCD thus corresponds to an image based on the electronic data information supplied to the pixel array 26 (e.g., via the switch network).

The polarizers 28 and 30 can be implemented as linear polarizing filters or circular polarizing filters. Circular polarizers include a linear polarizer on the front, which selects one polarization of light while rejecting another, followed by a quarter-wave plate, which converts the selected polarization to circularly polarized light. In linear polarizing filters, the polarizing effect is the same regardless of which side of the filter the scene is viewed from.

In the example of FIG. 2, the circuitry 18 includes a backlight controller 32 that is configured to control a backlighting driver 34. The backlighting driver 34 can be coupled to a voltage source 36 and configured to supply electrical energy via an output 38 that is provided to the backlight source 14. The controller 32 can operate the driver 34 in a voltage mode or a current mode, for example. While the driver is demonstrated as a separate block from the backlight control, the driver can be implemented as part of the control. The output 38 can include a plurality of output channels to supply voltage and/or current to the corresponding light sources. As disclosed herein, the number of output channels can be commensurate with the number of light sources 16 or groups of light sources that are independently controllable in the backlight source 14.

The backlight controller 32 can include one or more inputs 40. The input 40 can be employed to configure the controller 32 to specify the spatial position corresponding to the region of interest 20. The spatial position can be identified manually (e.g., in response to a user input) or automatically (e.g., in response to feedback from a camera during a calibration phase) or it may be set semi-automatically. In addition to identifying the spatial position of the region 20, the input 40 can be utilized to define a relative intensity level for the backlighting at the region 20 and the surrounding light sources. The relative intensity can be set manually (e.g., in response to a user input—responsive to watching the LCD 12) or automatically (e.g., in response to feedback from a camera during a calibration phase) or it may be set semi-automatically, such as to achieve the substantially uniform intensity across the LCD 12. The input 40 may also represent control information corresponding to modulation (e.g., inter-frame and/or intra-frame modulation) of pixels in the array 26. For instance, the backlight control 32 can employ the modulation information (or information derived therefrom) to dynamically control the individual light sources (e.g., LEDs) 16 in the backlight source 14.

While the partial mirror 22 tends to dim the display in the local region of the display that it covers, the circuitry 18 can increase the backlighting intensity locally for such region such as to mitigate the dimming effect of the partial mirror. As a result, the intensity of the display can appear to be uniformly lit across its surface (as viewed by a user). Additionally, a person can look directly at the display 24 and the mirror will reflect the person's direct gaze to a camera, thereby affording simultaneous viewing of the display screen by the user while also making direct eye contact with the camera. That is, since the camera is aimed at the mirror, which is located at an expected eye gaze point for a user, the image generated by the camera can effectively reflect the user's gaze directly into the camera while the user is actually looking directly at the display.

Figure 3:
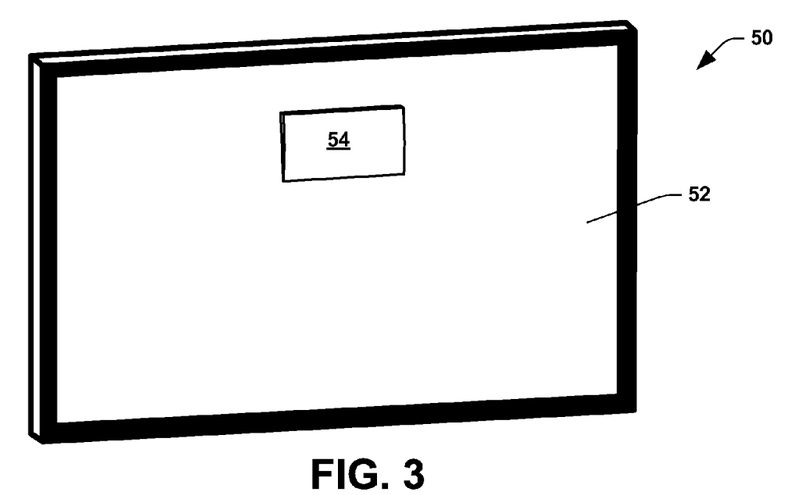
FIG. 3 depicts a perspective view of an example of a display apparatus.

FIG. 3 depicts a perspective view of a front of a display apparatus 50 (e.g., the display apparatus 2 of FIG. 1 or apparatus 10 of FIG. 2). The display apparatus 50 includes a front panel 52, of an optically transparent material. For example, the front panel 52 can comprise glass, a polymer (e.g., plastic) or other optically transparent material. The front panel 52 can be flat or it may be curved. A partial mirror 54 is located on the front panel 52. The partial mirror 54 is dimensioned as to cover a portion of the front panel 52 with the remaining portion of the display free from any obstruction from the mirror.

The partial mirror 54 can be positioned at an expected eye gaze point of the display. The eye gaze point can vary depending on, for example, the size of the display, the size and configuration of room in which the display will be situated. A given eye gaze point further can be the same for one or more different viewers, which may be at different positions to utilize a video conferencing system concurrently. That is, a given partial mirror can be used by multiple cameras to capture images of a plurality of users concurrently, such that when each user looks at a given display a captured image of each user will show such user looking directly at the respective camera (e.g., corresponding to a remote person involved in the video conference). While a single partial mirror 54 is shown on the display apparatus 50 of FIG. 2, there can be more than one partial mirror. As disclosed with respect to FIG. 2, the partial mirror 54 is partially reflective and partially optically transparent. The partial mirror can be configured with an angle relative to the surface of the front panel 52 to facilitate image capture of a user by a camera that can be hidden from direct view of the user.

Figure 4:
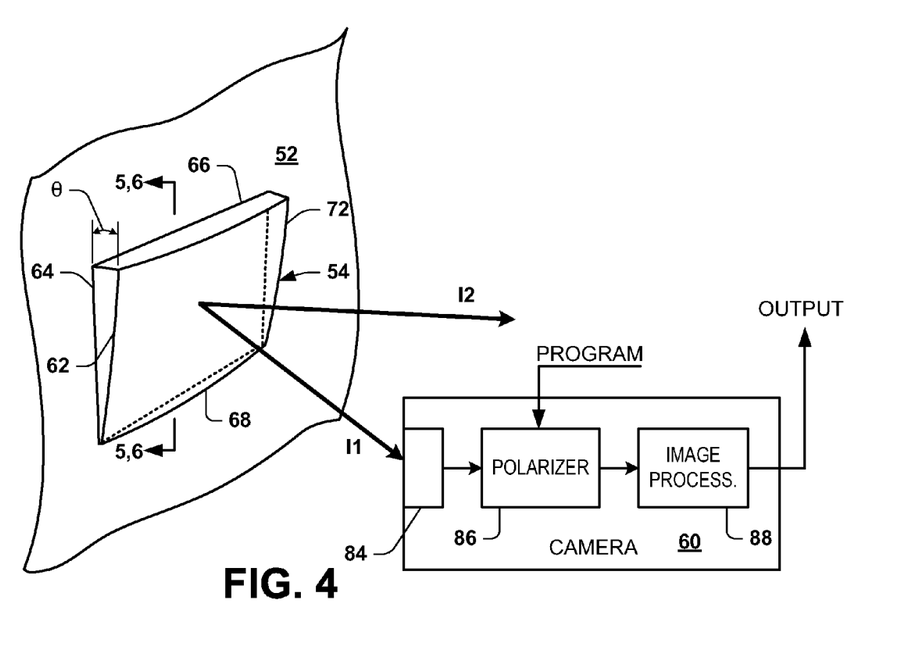
FIG. 4 depicts an enlarged view of part of the display apparatus of FIG. 2 in combination with a camera.

As an example, FIG. 4 depicts an enlarged view of a portion of the partial mirror 54 and a surrounding portion of the front panel 52. Also depicted in FIG. 4 is a camera 60 that is aimed at the partial mirror to capture light, demonstrated at I1, corresponding to an image of an object, such as including one or more users and part of the conferencing environment in which the display is situated. FIG. 4 also depicts light demonstrated at I2 that is generated from the display apparatus 50 and is transmitted through the partial mirror 54.

The partial mirror 54 can include an outer surface 62 which can include an amount of reflective material to provide a desired amount of reflectivity and transparency. Alternatively, the reflective material can be internal to the mirror. In the example of FIG. 4, the outer surface is at an angle θ relative to the exterior surface of the front panel 52. The outer surface 62 of the partial mirror can be substantially planar or it can be curved. The angle θ can be set depending on the expected location of the camera 60. In other examples, the angle θ can be adjustable such that it can be set at installation depending on the location of the camera. For instance, the partial mirror 54 can be selected from a plurality of partial mirrors having different angles and configurations. Alternatively, the angle θ can be adjustable by controlling its manner of attachment to the display 52 and/or providing a hinged connection of the reflective surface. The reflected light I1 and the transmitted light 12 thus represent light that is directed at different angles, the difference between such angles being commensurate to the angle θ.

The partial mirror 54 also includes top and bottom edges 66 and 68, respectively, which are spaced apart from each other by respective side edges 70 and 72. In the example, the top edge 66 is demonstrated as being thicker than the bottom edge 68, such as to provide for reflecting incident light downwardly toward the camera (e.g., downwardly as viewed from the example of FIG. 4). In other examples, such as where the camera is mounted above users, the bottom edge 68 can be thicker than the top edge 66 such as to reflect incident light upwardly (e.g., upwardly as viewed from the example of FIG. 4). In still other examples, the angle θ of the outer surface 62 and the orientation of the partial mirror can be at corresponding orientations to accommodate different camera positions.

The camera 60 can capture light 11 via optics 84, which light includes both light reflected from the partial mirror and the image 12 provided from the display. The optics 84 can provide the captured image to a polarizer 86. The polarizer 86 can be configured to pass light of a specific polarization and block light of other polarizations. For example, the display 52 provides light having a predetermined polarization and polarizer 86 can be configured to block light having such predetermined polarization. That is, the polarizer 86 can remove the light 12, which corresponds to an image generated from the display with a predetermined polarization, from the aggregate light 11 received by the camera. In some examples, the polarizer 86 has an optical axis that can be programmed (demonstrated via PROGRAM) to block light of a selected polarization. For instance, the polarization can be programmed by rotating a polarizing filter that is attached to the optics of the camera. While the polarizer 86 is demonstrated in the example of FIG. 4 as receiving a captured image from the optics 84, the polarizer itself can be mounted in front the optics and/or be implemented as part of the optics for the camera 60. The polarizer 86 can be implemented as a linear polarizer or a circular polarizer, and it can be implemented by various materials, such as crystals, thin films or the like.

The camera 60 can also include image processing block (e.g., hardware and/or software) 88 configured to generate an OUTPUT. The OUTPUT can be provided in a standard video format. For example, the image processing 88 of the camera 60 can provide the OUTPUT in an analog or digital format according to various standard codecs (e.g., digital DVI, analog VGA or the like). With proper setting of the polarizer, the light transmitted from the display can be blocked. The OUTPUT thus can represent an image of a one or more persons and a portion of the video conferencing environment.

Figure 5:
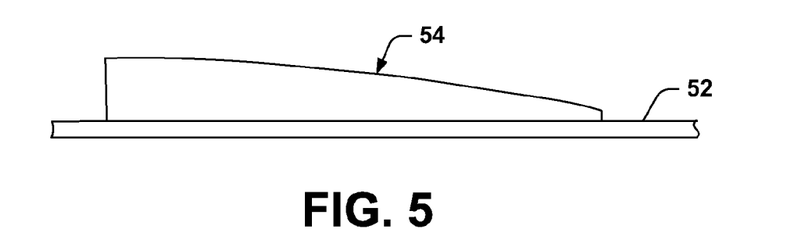
FIG. 5 is a cross-sectional view of part of a display apparatus, taken along line 5-5 of FIG. 4, depicting an example of a partial mirror.

FIG. 5 demonstrates a cross-sectional view of the partial mirror 54 mounted to the surface of the front panel 52. For example, the partial mirror can be flushly mounted to the front panel 52, such as by an optical adhesive. The partial mirror, the optical adhesive and the front panel substrate can be configured with substantially matched indices of refraction to mitigate blurring of light transmitted from the display through the partial mirror as compared to the rest of the display. Since the partial mirror 54 can be attached via an optical adhesive, it may be positioned at installation. Additionally, a plurality of differently configured partial mirrors (e.g., having different angles, different sizes or the like) can be provided, such that an appropriate configuration can be selected at installation based on application requirements. As disclosed with respect to FIG. 2, the backlight source can also be programmed at installation to provide for an appropriate increased intensity of backlight sources in alignment with the partial mirror 54.

Figure 6:
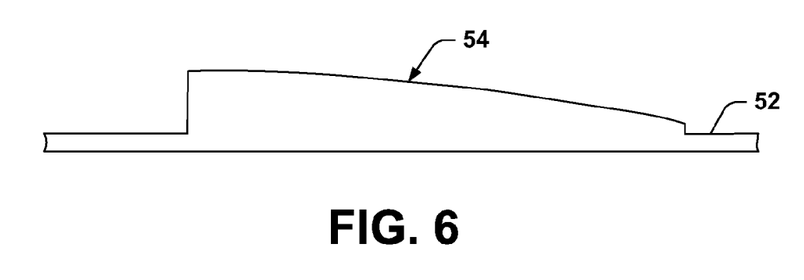
FIG. 6 is a cross-sectional view of part of a display apparatus, taken along line 6-6 of FIG. 4, depicting an example of a partial mirror.

As an alternative, the partial mirror 54' can be integrally formed with the front panel 52 such as demonstrated in the example of FIG. 6. In this example, the partial mirror can be implemented within the same substrate material monolithically with the front panel 52. The reflective material may be applied as a thin film on the surface 62 or it may be embedded within the substrate material. In this example, the backlighting control for the region where the intensity is increased can be set by the manufacturer, which intensity may be adjusted at installation. As another example, by proper placement of the partial mirror 54 integrally with the front panel 52, the same panel may be inverted (e.g., rotated 180 degrees) to accommodate different camera positions. In this example, backlighting controls can be set at the factory or calibrated at installation.

Figure 7:
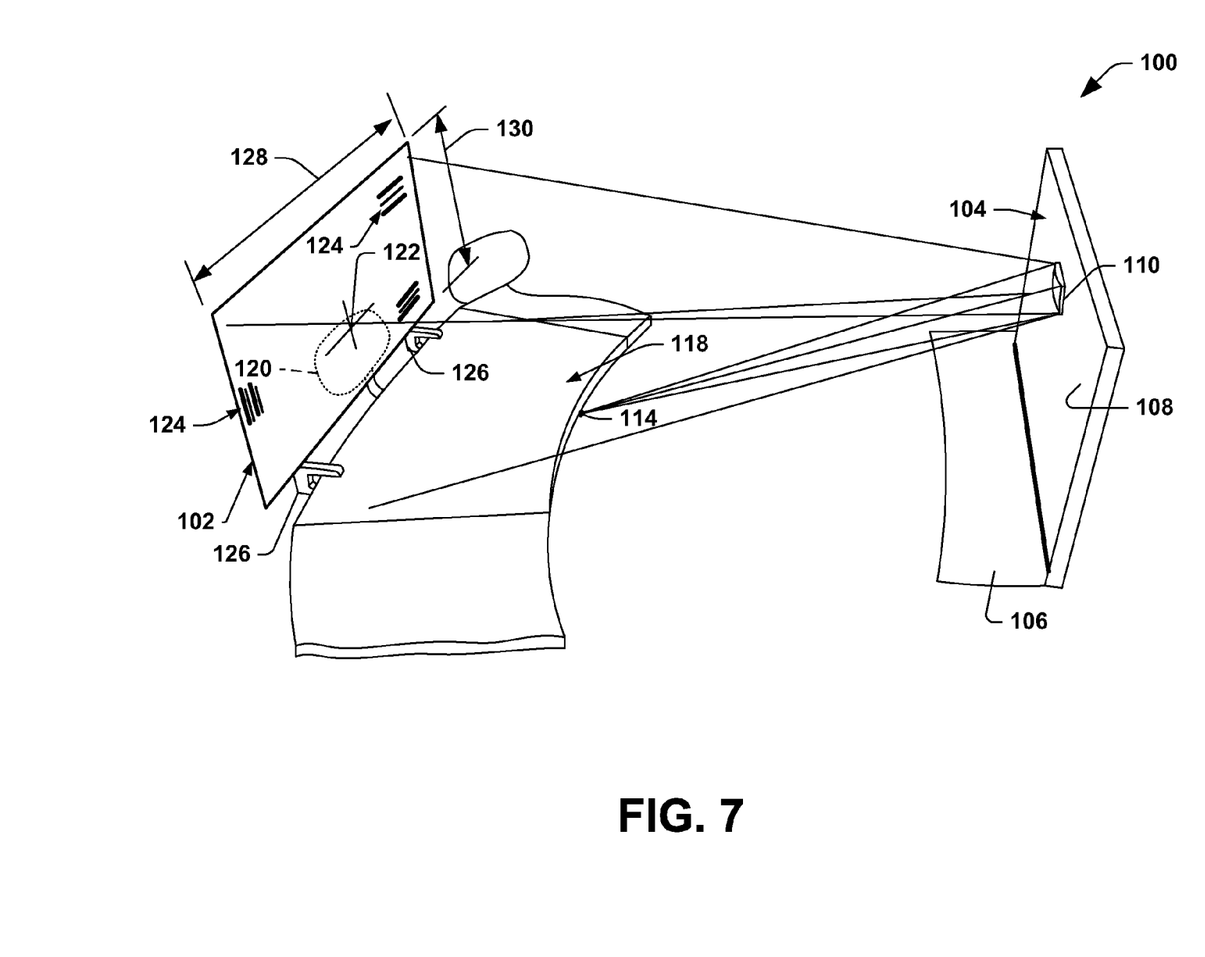
FIG. 7 depicts an example of a video conferencing system demonstrating part of a setup process.

FIG. 7 demonstrates an example of a video conferencing system 100. Also depicted in FIG. 7 is an installation tool 102 that can be employed to help setup the video conferencing system 100. In the example of FIG. 7, the video conferencing system 100 includes a display apparatus 104 mounted on a support (e.g., a table or a stand) 106. The display apparatus 102 can be configured according to the example of FIG. 2. For instance, the display apparatus can include an LCD 108 with a partial mirror 110 positioned on the front panel of the LCD. As one example, the partial mirror 110 can cover a small portion of the LCD 108, such as less than 50% of the surface area of the front panel. As another example, the partial mirror 110 can cover a smaller portion of the LCD 108, such as less than or equal to about 10% of the surface area of the front panel. The display apparatus 102 can control the backlighting behind the partial mirror 110 to substantially cancel the dimming effect on light that is transmitted from the display through the mirror, such as disclosed herein.

In the example of FIG. 7, a camera 114 is aimed at the partial mirror 110, such as having its field of view within the edges of the partial mirror. Alternatively, a slightly larger field of view can be provided and the image can be cropped through image processing (e.g., via image processing block 88 of FIG. 4). The camera 114 can also implement a polarizer to cancel (e.g., block) polarized light that is provided from the LCD, as disclosed herein.

By way of example, during set up the camera 114 is aimed at the partial mirror 110 as to capture an image of the installation tool 102. The output of the camera can be provided to the display apparatus 104 or to one or more other display devices (not shown). The installation tool 102 can be mounted to a table 118 or other structure (e.g., a chair) 120 that may be located at the user location via mounting brackets configured to attach the tool. The camera 114 can be tuned such that an expected eye location 122 for a user can be located at or near the center of the installation tool 102 for the camera's field of view. The eye gaze point 122 can be marked on the installation tool 102 by cross-airs (e.g., "+"), for example. Additional markings 124 can be printed on the installation tool 102 to help focus the camera 114. The tuning and focusing of the camera 114 can be implemented manually or it can be automated.

An additional part of the installation and set up of the system 100 can include adjusting the backlighting of the display apparatus 102 to mitigate the local dimming caused by the placement of the partial mirror. As an example, a user can visually monitor the display apparatus while an image or video is being presented on the display apparatus 104. The image or video can be a live image or video or a specially designed installation image or video. A user interface for the display apparatus 104 can be configured to selectively adjust the intensity of backlighting for one or more regions of the LCD 108. As disclosed herein, this may involve increasing the intensity within a region of the display aligned with the partial mirror 110, decreasing the intensity of the backlighting outside of such region or a combination thereof. The backlighting for the display apparatus 104 can be constant or it may be dynamically controlled as disclosed herein.

In view of the foregoing structural and functional features described above, example methods will be better appreciated with reference to FIG. 7. While, for purposes of simplicity of explanation, the method is shown and described as executing serially, it is to be understood and appreciated that such method is not limited by the illustrated order, as parts of the method could occur in different orders and/or concurrently from that shown and described herein. Such method or portions thereof can be implemented as instructions stored in memory or executed by a processor of a computer or related video conferencing system, for example.

Figure 8:
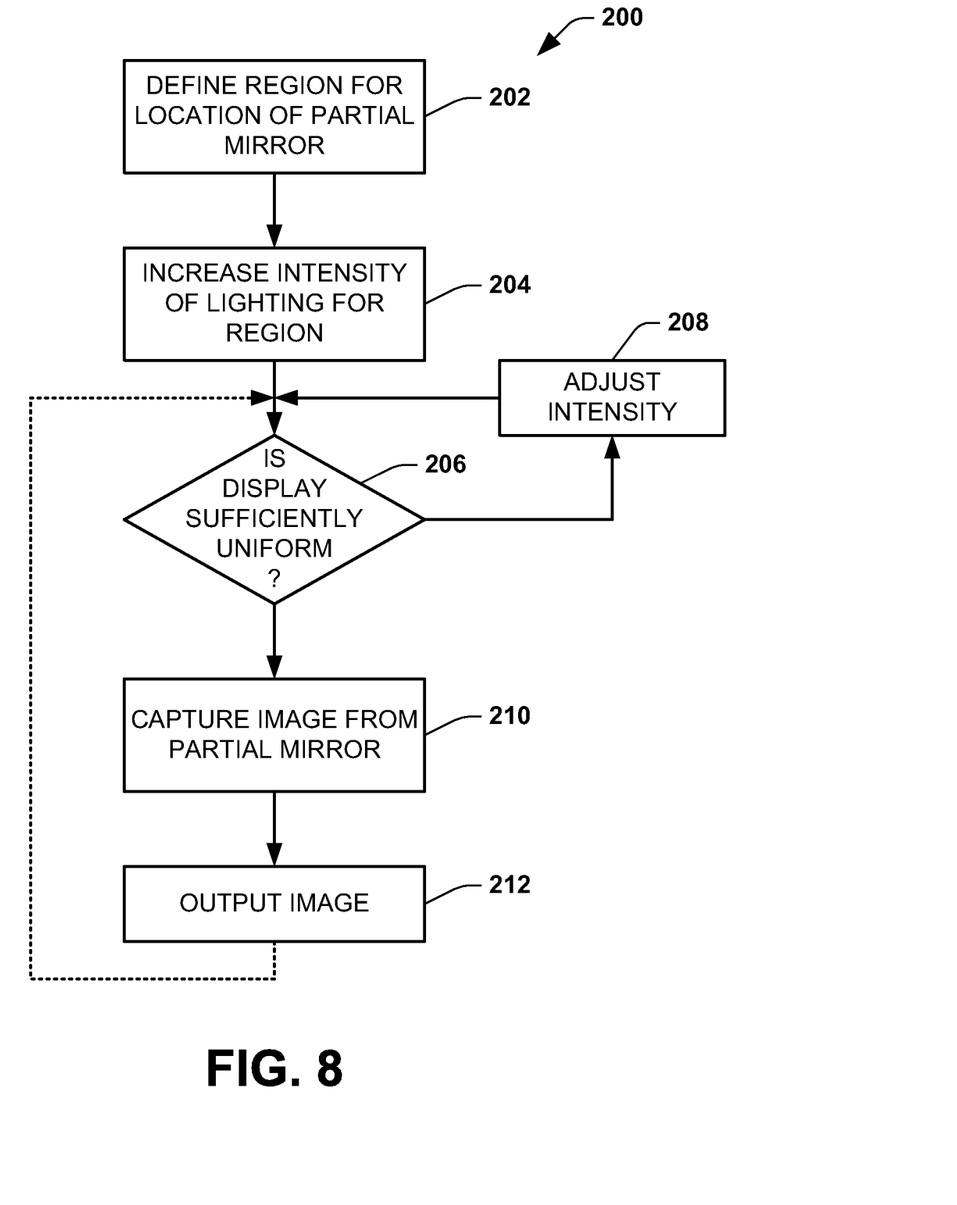
FIG. 8 is a flow diagram depicting an example of a method of operating a video conference system.

FIG. 8 depicts an example of a method 200 for operating a display apparatus (e.g., the apparatus 2 of FIG. 1 or apparatus 10 of FIG. 2) in the context of a video conferencing system. At 202, the method 200 includes defining a region of the display apparatus for locating a partial mirror (e.g., the mirror 7 of FIG. 1 or mirror 22 of FIG. 2). As disclosed herein there can be one or more partial mirrors and thus one or more such regions can be defined at 202. At 204, the intensity of lighting for the region can be controlled (e.g., by control system 6 of FIG. 1 or circuitry 18 of FIG. 2) to be greater relative to the lighting outside of such region. For example, the lighting can be implemented by a plurality of light sources (e.g., LEDs) that can be controlled individually or controlled in groups, such as disclosed herein.

At 206, a determination can be made as to whether a displayed image on the apparatus appears sufficiently uniform. This determination can be automated, it can be manually performed or it can involve both manual and automated portions. If the displayed image does not appear sufficiently uniform, the method can proceed to 208 and the backlighting intensity of the region can be adjusted relative to the intensity outside of the region. The adjustments at 208 can increase or decrease the relative intensity for the region. The method proceeds from 208 to 206 where the determination can be repeated. If the determination at 206 indicates that the display appears sufficiently uniform, the method can proceed to 210. At 210, light from the partial mirror can be captured (e.g., by the camera 60 of FIG. 4). The light being captured at 210 can include light reflected from the mirror as well as light transmitted through the mirror from the display apparatus. The light capture can also include polarizing the incident light to block oppositely polarized light, namely polarized light that is provided from the display apparatus. At 212, the resulting image can be output, such as can be transmitted to other participants of a video conference. In some examples, the method can return to 206 to repeat the adjusting of the backlighting intensity at 208, such as can be part of a periodic tuning or maintenance procedure.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements.

As used herein, the term "includes" means includes but not limited to, the term "including" means including but not limited to. The term "based on" means based at least in part on.

What is claimed is:

1. A display apparatus comprising:
an illumination source comprising a backlight source that provides light across a surface area of a front panel of the display apparatus;
a liquid crystal display (LCD) configured to illuminate a plurality of pixels to provide light from the LCD according to an electronic image to be presented, the light from the LCD, including light that is transmitted through a local region of the front panel, has a predetermined polarization, the local region of the front panel corresponding to a location for a partial mirror at the front panel; and
a control system configured to control the backlight source to increase an intensity of the light for the local region of the front panel of the display apparatus relative to an intensity of the light from the backlight source for at least an adjacent region of the front panel that is adjacent to the local region.

2. The apparatus of claim 1, wherein the backlight source comprises a plurality of light sources, the control system being configured to control a group of the light sources, which are substantially aligned with the local region, to increase the intensity of the backlighting for the local region relative to the adjacent region.

3. The apparatus of claim 2, wherein the plurality of light sources comprises an arrangement of light emitting diodes.

4. The apparatus of claim 2, wherein the control system is configured to control each of the plurality of light sources independently for increasing the intensity for the local region.

5. The apparatus of claim 2, wherein the control system is configured to dynamically modulate each of the plurality of light sources.

6. The apparatus of claim 1, further comprising the partial mirror at the local region and configured to partially transmit and partially reflect light through the partial mirror, such that an intensity of the light transmitted through the partial mirror is attenuated relative to the intensity of light from the adjacent region, the increase in intensity of the light for the local region mitigating effects of the attenuation.

7. The apparatus of claim 6, wherein the control system is configured to control the intensity of the light for the local region based on at least one of transmittance and reflectivity of the partial mirror.

8. The apparatus of claim 6, wherein the partial mirror comprises a reflective surface that is oriented at an angle relative to a surface of the front panel.

9. The apparatus of claim 6, wherein the local region of the front panel, corresponding to the partial mirror, is less than 50% the area of the front panel of the display apparatus.

10. The apparatus of claim 1, in combination with a camera to provide a video conferencing system, the camera being configured to capture light from the partial mirror, the light from the partial mirror including light transmitted through the partial mirror from the display apparatus and light reflected from the partial mirror.

11. The system of claim 10, wherein the camera further comprises a polarizing filter configured to block the light transmitted through the partial mirror from the apparatus which is also polarized.

12. The system of claim 1, wherein the backlight source comprises a plurality of light emitting diodes, each of which produces light with an intensity based on a control signal from the control system.

13. A video conferencing system, comprising:
a display apparatus comprising:
a front panel having a surface that provides light produced by the display apparatus;
a plurality of backlight sources, the intensity of at least some of the plurality of backlight sources being independently controllable to increase a relative intensity of the light for a local region of the front panel compared to an intensity of light for a remaining portion of the front panel; and
a partial mirror located at the local region of the front panel, the partial mirror being configured to direct light from a surface of the partial mirror toward a camera, the light from the partial mirror including the light produced by the display apparatus, having a predetermined polarization, and light reflected by the partial mirror toward the camera;
the camera configured to receive the light from the partial mirror and to block a portion of the light received that has the predetermined polarization.

14. The system of claim 13, wherein the display apparatus further comprises a liquid crystal display (LCD) configured to illuminate a plurality of pixels based on an electronic image to be presented, light from the LCD having the predetermined polarization.

15. The system of claim 13, wherein the plurality of backlight sources comprise light emitting diodes.

16. A method comprising:
identifying a proper subset of a plurality of backlight sources that provide backlighting for a local region of a front panel of a display corresponding to a location of a partial mirror, the display providing light having a predetermined polarization; and
controlling an intensity of the light for the identified subset of backlight sources such that the intensity for light provided to the local region of the front panel where the partial mirror is located is increased relative to an intensity of light provided to the front panel around the partial mirror, such that an intensity of light transmitted through the partial mirror and from the front panel around the partial mirror appears substantially uniform.

17. The method of claim 16, further comprising:
capturing light from the partial mirror, a portion of the captured light including light reflected from the partial mirror and another portion of the captured light including light transmitted through the partial mirror that is provided from the display;
blocking a portion of the captured light having the predetermined polarization; and
outputting an image that based on the light reflected from the partial mirror without the light provided from the display.

18. The method of claim 17, wherein the plurality of light sources comprise light emitting diodes.

\* \* \* \* \*